(12) United States Patent
Adari

(10) Patent No.: US 10,648,548 B2
(45) Date of Patent: May 12, 2020

(54) THRUST WASHER INCLUDING RADIALLY EXTENDING CONNECTORS

(71) Applicant: Schaeffler Technologies AG & Co. KG, Herzogenaurach (DE)

(72) Inventor: Sagar Adari, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 608 days.

(21) Appl. No.: 15/334,464

(22) Filed: Oct. 26, 2016

(65) Prior Publication Data

US 2018/0112756 A1 Apr. 26, 2018

(51) Int. Cl.
| | |
|---|---|
| *F16H 45/02* | (2006.01) |
| *F16C 33/10* | (2006.01) |
| *F16C 33/20* | (2006.01) |
| *F16C 33/08* | (2006.01) |
| *F16C 17/04* | (2006.01) |
| *F16D 13/40* | (2006.01) |
| *F16H 41/24* | (2006.01) |

(52) U.S. Cl.
CPC ............ *F16H 45/02* (2013.01); *F16C 17/04* (2013.01); *F16C 33/08* (2013.01); *F16C 33/1065* (2013.01); *F16C 33/201* (2013.01); *F16D 13/40* (2013.01); *F16H 41/24* (2013.01); *F16C 2226/74* (2013.01); *F16C 2226/76* (2013.01); *F16C 2361/65* (2013.01); *F16H 2045/0205* (2013.01); *F16H 2045/0221* (2013.01); *F16H 2045/0231* (2013.01); *F16H 2045/0247* (2013.01); *F16H 2045/0263* (2013.01); *F16H 2045/0278* (2013.01)

(58) Field of Classification Search
None
See application file for complete search history.

(56) References Cited

U.S. PATENT DOCUMENTS

| | | | | |
|---|---|---|---|---|
| 5,007,746 | A * | 4/1991 | Matzelle | F16C 17/04 384/420 |
| 5,489,255 | A * | 2/1996 | Hinckley | F16C 19/30 384/620 |
| 6,273,685 | B1 * | 8/2001 | Kuhn | F04B 1/0404 384/298 |
| 6,533,461 | B2 * | 3/2003 | Gottlieb | F16C 19/30 384/255 |

(Continued)

*Primary Examiner* — Charles A Fox
*Assistant Examiner* — Ryan P Dodd
(74) *Attorney, Agent, or Firm* — Davidson, Davidson & Kappel, LLC

(57) ABSTRACT

A thrust washer is provided. The thrust washer includes an annular base including a radially extending thrust surface, a further radially extending surface on an opposite side of the annular base from the radially extending thrust surface, an outer circumferential surface extending axially from the radially extending thrust surface to the further radially extending surface and an inner circumferential surface extending axially from the radially extending thrust surface to the further radially extending surface. The thrust washer also includes radially extending connectors extending radially outward from the annular base. A motor vehicle drivetrain assembly, a torque converter and a method of connecting a thrust washer to a component are also provided.

16 Claims, 5 Drawing Sheets

(56) References Cited

U.S. PATENT DOCUMENTS

2008/0190102 A1* 8/2008 Kawamura ............. F16H 41/24
60/365
2015/0167809 A1* 6/2015 Simon .................... F16H 41/24
60/331

* cited by examiner

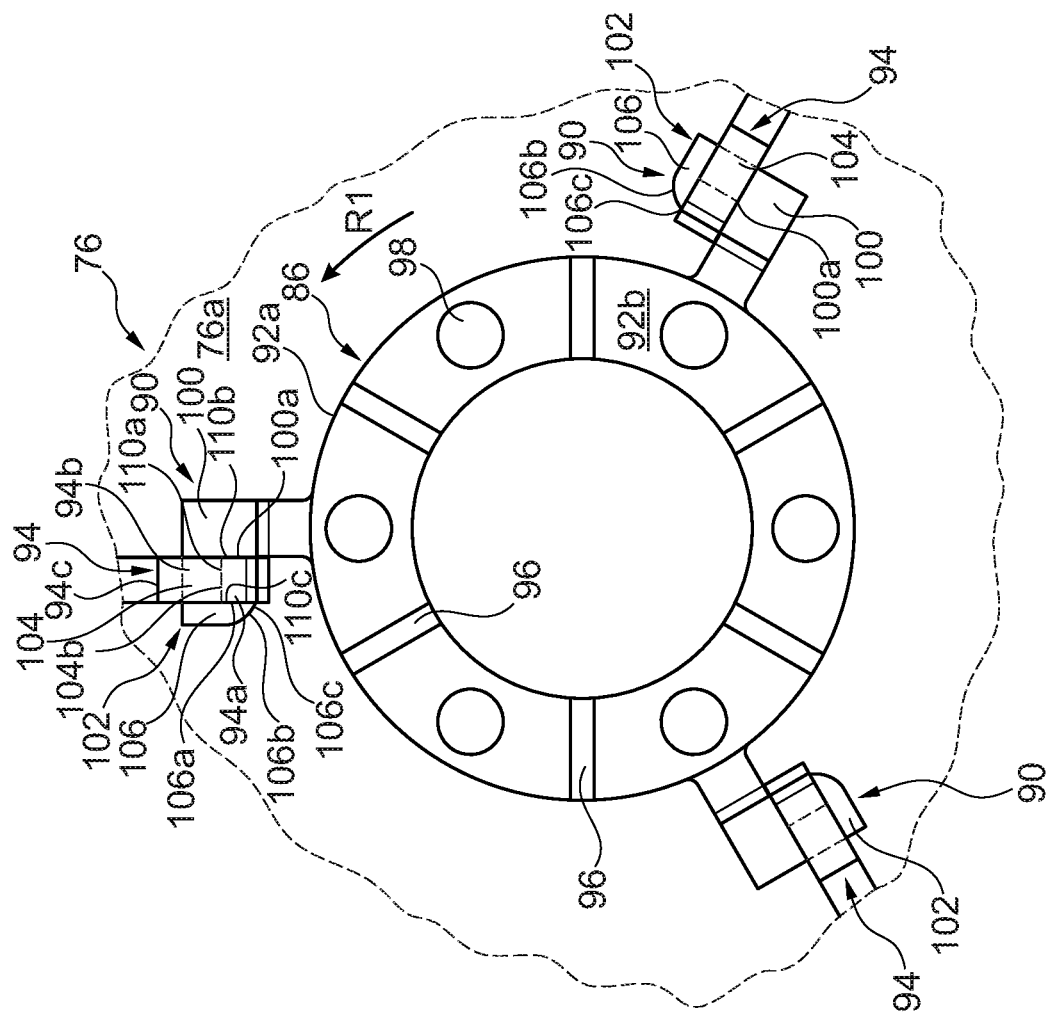
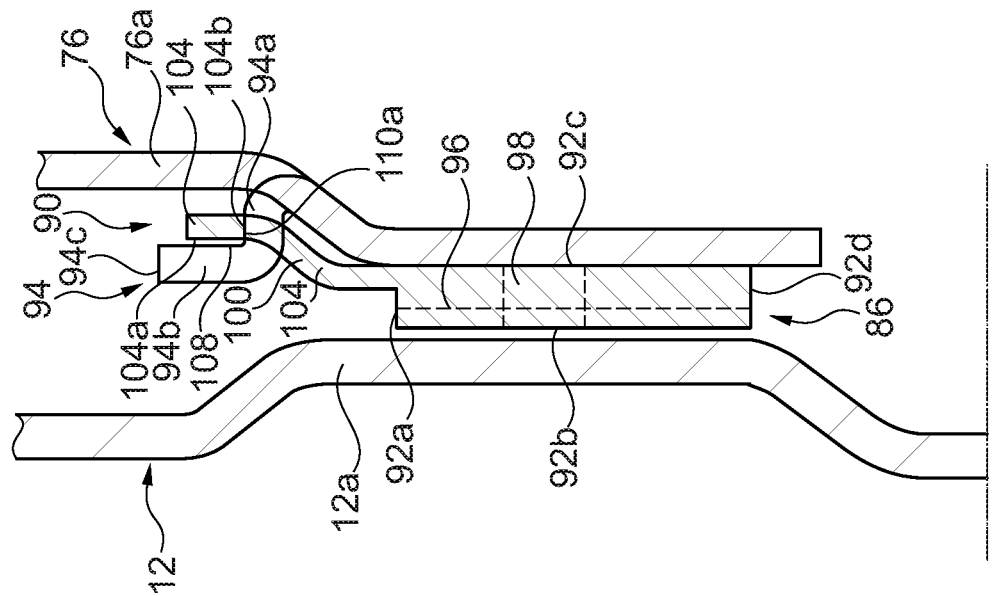
Fig. 4
Fig. 3

THRUST WASHER INCLUDING RADIALLY EXTENDING CONNECTORS

The present disclosure relates generally to thrust washer and more specifically to thrust washers for motor vehicle drivetrains.

BACKGROUND

FIG. 1 discloses a conventional thrust washer 300 including an annular base 302 having a low friction surface 304 for contacting a first component 306 and a further opposite surface 308 for contacting a first surface 310 of a second component 312 to which the thrust washer 300 is fixed. The thrust washer 300 includes connectors 314 extending axially from the annular body 302. The connectors 314 are in the form of axially extending posts 316 for extending axially through the second component 312. The axially extending posts 316 have radially extending clips 318 for contacting a second surface 320 of the second component 312.

SUMMARY OF THE INVENTION

A thrust washer is provided. The thrust washer includes an annular base including a radially extending thrust surface, a further radially extending surface on an opposite side of the annular base from the radially extending thrust surface, an outer circumferential surface extending axially from the radially extending thrust surface to the further radially extending surface and an inner circumferential surface extending axially from the radially extending thrust surface to the further radially extending surface. The thrust washer also includes radially extending connectors extending radially outward from the annular base.

A motor vehicle drivetrain assembly is also provided that includes a component including a plurality of circumferentially spaced tabs; and the thrust washer connected to the component by each of the radially extending connectors being connected to one of the tabs.

A torque converter is also provided including the motor vehicle drivetrain assembly in which the component is a cover plate of a damper assembly.

A method of connecting a thrust washer to a component is also provided. The method includes providing a component including a plurality of circumferentially spaced tabs; and connecting the thrust washer to the component by rotating thrust washer such that a clip of each of the radially extending connectors secures a respective axially extending section of one of the tabs.

BRIEF DESCRIPTION OF THE DRAWINGS

The present invention is described below by reference to the following drawings, in which:

FIG. 3 shows an enlarged cross-sectional side view of a portion of the torque converter shown in FIG. 2, including a thrust washer in accordance with an embodiment of the present invention;

FIG. 4 shows a plan view of the thrust washer shown in FIG. 3;

DETAILED DESCRIPTION

The disclosure provides, for designs in which axial space is limited, a thrust washer including radial clipping tabs as attachment means is disclosed. The tabs extend radially outward from the washer and include circumferentially extending clips to attach to lanced features on the neighboring plate.

Figure 1:
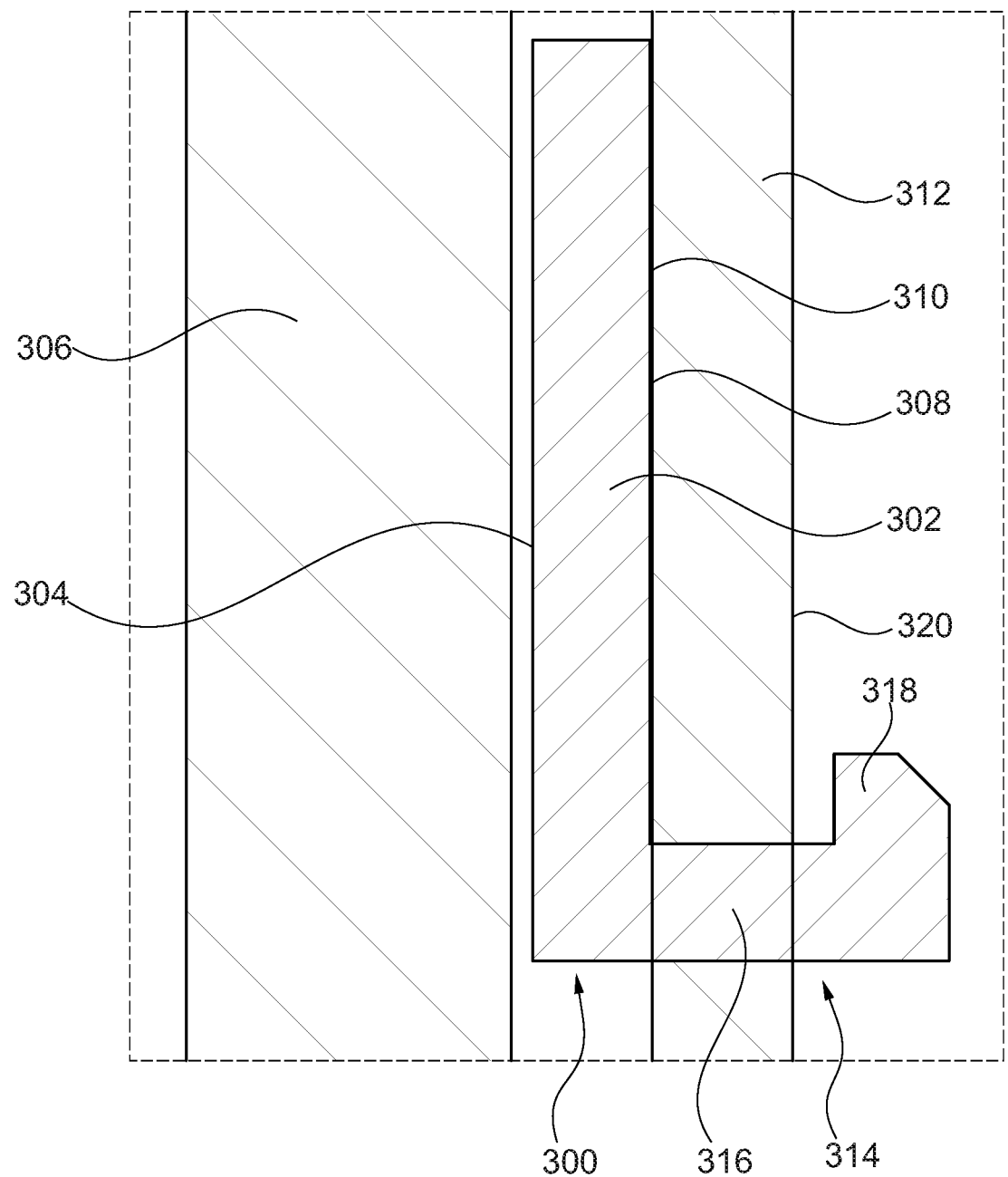
FIG. 1 shows a cross-sectional side view of a conventional thrust washer.
Figure 2:
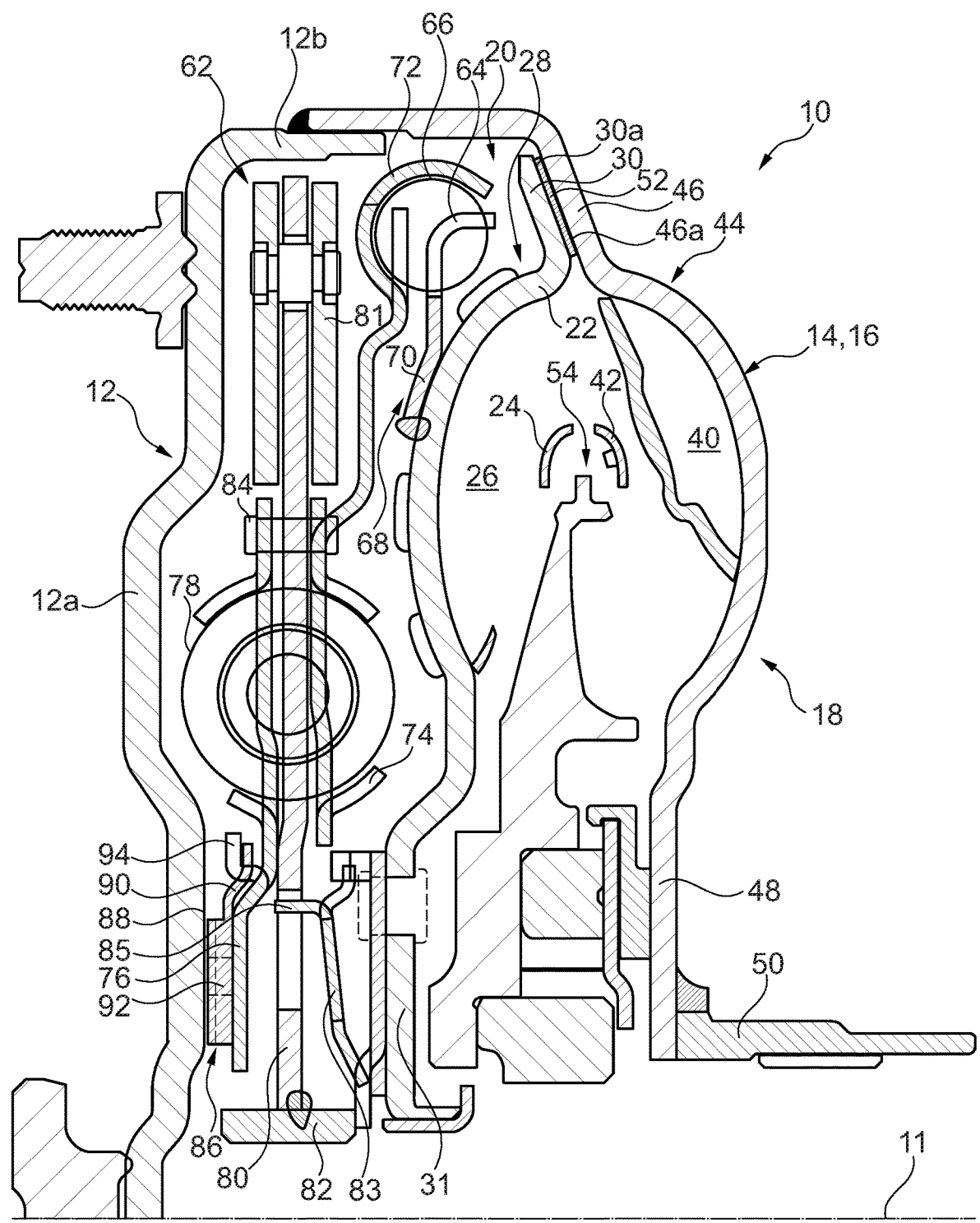
FIG. 2 shows a cross-sectional side view of a torque converter in accordance with an embodiment of the present invention.

FIG. 2 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Front cover 12 is substantially cup-shaped and includes a radially extending section 12a that intersects and extends radially away from center axis 11 and an annular axially extending section 12b that protrudes axially at an outer circumference of section 12a.

Torque converter 10 also includes a turbine 20 configured to define a piston that is axially moveable toward and away from impeller 18 to engage and disengage a clutch portion of impeller 18 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl, for contacting engine side edges of turbine blades 26. Radially inside of blade supporting portion 28, turbine shell 22 includes an annular inner radial extension 31.

Radially outside of blade supporting portion 28 and turbine blades turbine blades 26, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumferential surface 30b of turbine 20. Accordingly, the piston and turbine shell 22 are formed as a single piece.

Impeller 18 includes impeller blades 40, which are each fixed at a transmission side thereof to impeller shell 16 and are each fixed to an impeller core ring 42 at an engine side thereof by tabs. Impeller shell 16, at radially extending section 14a of rear cover 14, includes a rounded blade supporting portion 44, which is shaped as an annular bowl, for contacting transmission side edges of impeller blades 42. Radially outside of blade supporting portion 32 and impeller blades 42, radially extending section 14a includes a radially extending wall 46, which forms an impeller clutch, radially protrudes outwardly from an outer circumference of rounded blade supporting portion 44 to define an annular wall having a flat annular radially extending turbine facing surface 46a. Accordingly, the impeller clutch and impeller shell 16 are formed as a single piece. Radially inside of blade supporting portion 44, impeller shell 16 includes an annular inner radial extension 48 extending radially inward from blade supporting portion 44. A radially inner end of extension 48 is connected to an impeller hub 50.

A friction material 52 is bonded onto radially extending impeller facing surface 30a of outer radial extension 30 for engaging radially extending wall 46. In other embodiments, instead of or in addition to being bonded to outer radial extension 30, friction material 52 may be bonded to radially extending turbine facing surface 46a of radially extending wall 46. Regardless of whether friction material 52 is bonded to outer radial extension 30 or radially extending wall 46, friction material 52 is provided axially between surfaces 30a, 46a. Torque converter 10 also includes a stator 54 axially between turbine 20 and impeller 18 to redirect fluid flowing from the turbine blades 26 before the fluid reaches impeller 18 to increase the efficiency of torque converter 10.

A damper assembly 62 is positioned between front cover 12 and turbine 20 and is configured for transferring torque from turbine 20 to a transmission input shaft that is splined to the damper hub 82. In this embodiment, damper assembly 62 is connected to the turbine piston 20 for rotation therewith by drive tabs 64 circumferentially engaging a radially outer set of springs 66 of damper assembly 62. Drive tabs 64 as formed as part of a drive ring 68 fixed to a front cover facing surface of turbine shell 22 at blade supporting portion 28. An annular base 70 of drive ring 68 is fixed in contact with front cover facing surface of turbine shell 22 by welding, brazing or riveting. Drive tabs 64 are circumferentially spaced from each other and extend into spaces formed circumferentially between springs 66 to contact circumferential edges of springs 66. Springs 66 are retained by a spring retainer 72 that wraps around a contour of the outer diameter of springs 66 and is formed at a radially outer end of a first or turbine side cover plate 74 of damper assembly 62. Damper assembly 62 further includes a second or front cover side cover plates 76.

Cover plates 74, 76 support a set of circumferentially spaced radially inner springs 78, which are radially inside of springs 66, axially therebetween. Damper assembly 62 also includes a drive flange 80 positioned axially between cover plate 74, 76 including a hub 82 at a radially inner end thereof configured for nonrotatably connecting to the transmission input shaft. Radially outside of springs 78, cover plates 74, 76 are fixed together by a plurality of circumferentially spaced rivets 84. Drive flange 80 includes circumferentially extending slots for receiving springs 66 formed therein and a centrifugal pendulum absorber 81 at a radially outer end thereof. Damper assembly 66 also includes a turbine-side bias spring 83, which in this embodiment is a diaphragm spring, provided axially between flange 80 and inner radial extension 31 of turbine 20. Bias spring 83 includes a plurality of radially and axially extending tabs 85 for interacting with ramps of flange 80 such that relative circumferential motion between drive flange 80 and bias spring 83 generates a force on turbine piston 20. When damper assembly 62 travels into the coast direction, tabs 85 of bias spring 83 contracts ramps of flange 80 to produce an axial force that is transmitted by bias spring 83 to turbine piston 20.

In accordance with an embodiment of the present invention, a thrust washer 86 is provided at a front cover side of second cover plate 76 to contact an inner surface 88 of radially extending section 12a of front cover 12 to prevent cover plate 76 from contacting front cover 12 during rotation thereof about axis 11 in a manner that generates wear-causing friction. As described further below, thrust washer 86 includes radially extending connectors 90 protruding radially from an outer circumferential surface 92a of an annular body 92 thereof that fix thrust washer 86 to cover plate 76 by extending circumferentially around tabs 94 of cover plate 76.

FIG. 3 shows an enlarged cross-sectional side view of thrust washer 86 and portions of cover plate 76 and radially extending section 12a of front cover 12. FIG. 4 shows a plan view of thrust washer 86. As shown in FIGS. 3 and 4, cover plate 76 is provided with lanced tabs 94 formed by lancing a base portion 76a of cover plate 76. Tabs 94 protrude from base portion 76a axially toward radially extending section 12a of front cover 12. Tabs 94 each include an axially extending section 94a extending from base section 76a toward front cover section 12a and a radially extending section 94b extending radially outward from axially extending section 94a to form a free end 94c of tab 94.

On a first side thereof facing front section 12a, annular body 92 of thrust washer 86 includes a low friction radially extending thrust surface 92b for contacting inner surface 88, while on a back side thereof facing cover plate 76, annular body 92 includes a further radially extending surface 92c contacting cover plate. In one preferred embodiment, thrust washer 86 is formed of a polymer such as Torlon such that thrust surface 92b is low friction. Outer circumferential surface 92a and an inner circumferential surface 92d of annular body 92 extend axially between radially extending surfaces 92b, 92c. Thrust surface 92b includes a plurality of circumferentially spaced radially extending grooves 96 provided therein extending from inner circumferential surface 92d to outer circumferential surface 92a allowing for fluid to flow radially through annular body 92. Circumferentially between each of grooves 96, annular body is provided with through holes 98 extending axially from front surface 92b to rear surface 92c.

Connectors 90 extend radially outward from outer circumferential surface 92a. More specifically, connectors 90 each include an arm 100 extending radially from outer circumferential surface 92a into a circumferentially extending clip 102 that wraps around the corresponding tab 94. Clip 102 includes a circumferentially extending portion 104 extending circumferentially from arm 100 and a radially extending portion 106 extending radially back toward outer circumferential surface 92a. In other words, arm 100 is directly connected to annular base 92 at outer circumferential surface 92a and circumferentially extending portion 104 extending circumferentially from an outer radial end of arm 100 to radially extending portion 106. At the end of circumferentially extending portion 104 that is opposite the end joining arm 100, radially extending portion 106 extends radially inward from circumferentially extending portion 104 back toward annular base 92.

Arm 100 also extends axially away from annular base 92 toward base portion 76a of cover plate 76 and extends axially past a rear side surface 108 of radially extending section 94b of tab 94, with a front side surface 104a of circumferentially extending portion 104 directly facing and/or contacting rear side surface 108 and an inner surface circumferentially extending surface 104b of circumferentially extending portion 104 contacting an outer circumferentially extending surface 110a of axially extending section 94a.

Axially extending section 94a of tab 94 is sandwiched circumferentially between radially extending edge 100a of arm 100 and a radially extending edge 106a of radially extending portion 106 of clip 102, with a first radially extending edge 110b of axially extending section 94a contacting radially extending edge 100a and a second radially extending edge 110c of axially extending section 94a contacting radially extending edge 106a. To install connectors 90 onto tabs 94, radially extending portions 106 of clips 102 are each aligned adjacent to the respective radially extending tab edge 110b such that an inclined surface 106b of each radially extending clip portion 106 contacts a radially outer end of edge 110b, where surface 110a and edge 110b meet, and thrust washer 86 is rotated in a rotational direction R1 such that contact between inclined surface 106b and the radially outer end of edge 110b forces the respective clip 102 radially outward, such that an innermost edge 106c of radially extending portion 106 slides along surface 110a as thrust washer 86 is rotated, until each innermost edge 106c reaches edge 110c and the respective clip 102 snaps radially inward such that edge 106a contacts edge 110c and the clip 102 is wrapped around the respective tab 94, connecting the thrust washer 86 to the cover plate 76.

Figure 5:
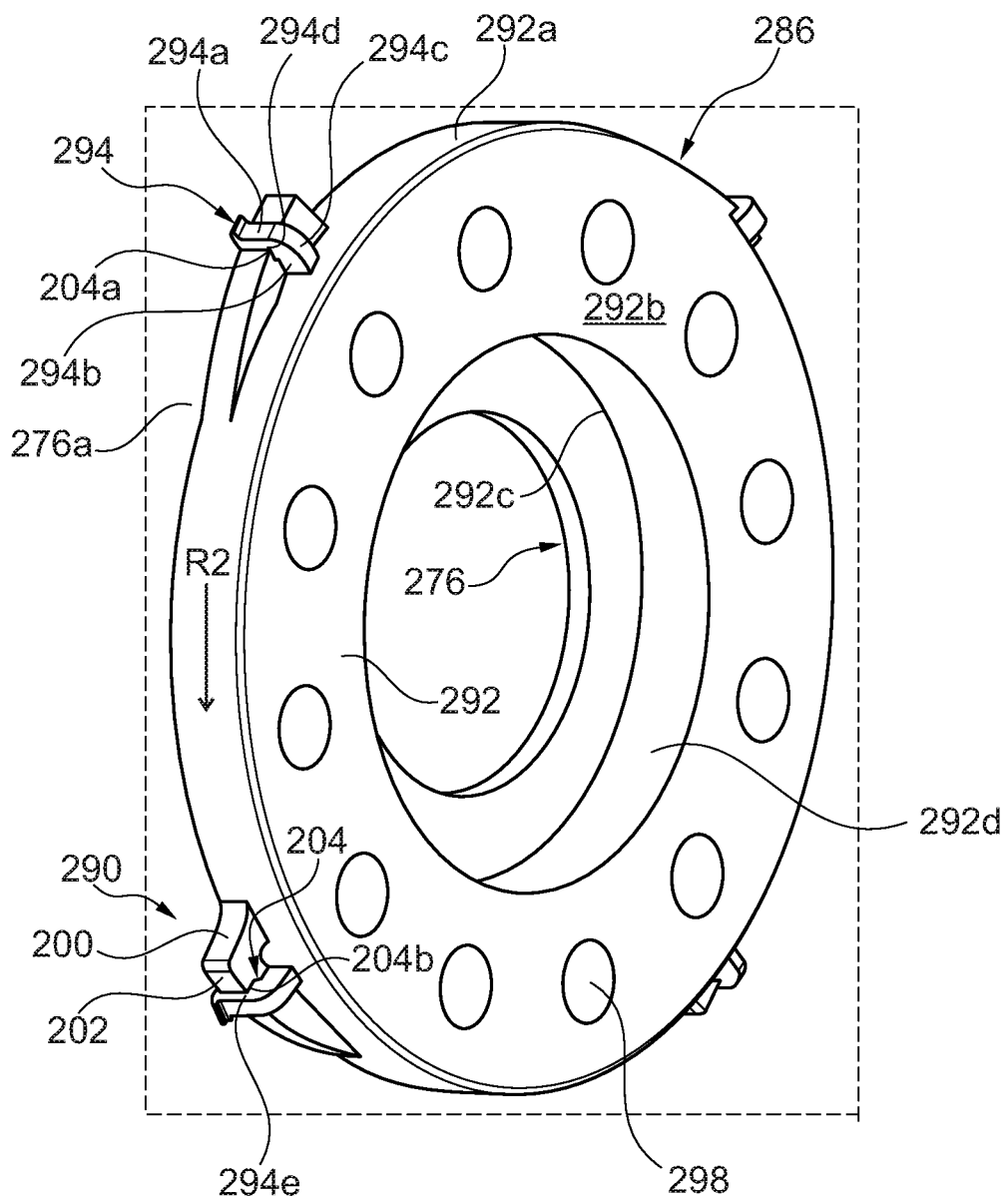
FIG. 5 shows an enlarged perspective side view of a first side of a thrust washer and a portion of a cover plate in accordance with another embodiment of the present invention.
Figure 6:
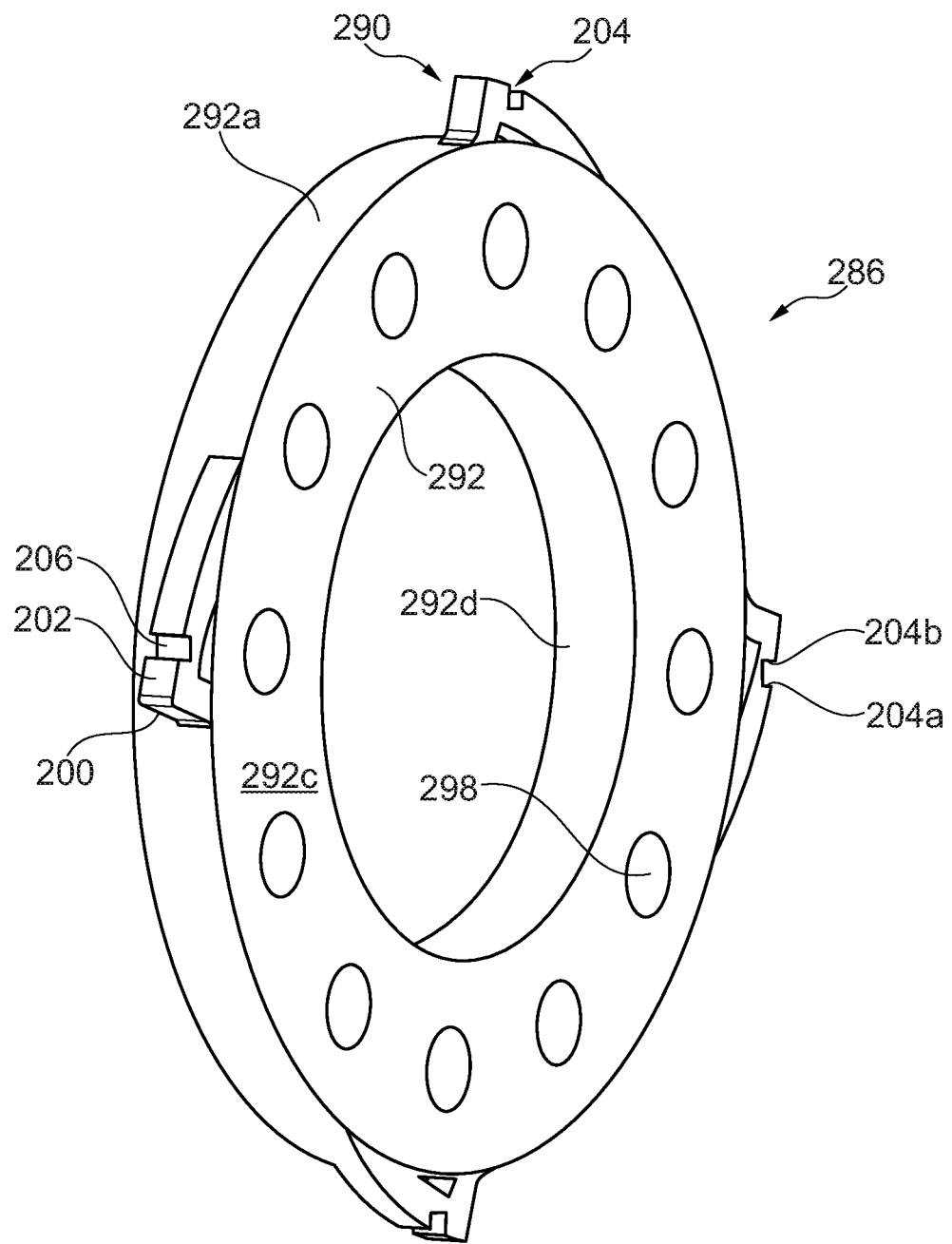
FIG. 6 shows perspective view of a second side of the thrust washer shown in FIG. 5.

FIG. 5 shows an enlarged perspective side view of a first side, here an engine-side, of a thrust washer 286 and a portion of a cover plate 276 in accordance with another embodiment of the present invention. FIG. 6 shows perspective view of a second side, here a transmission-side, of thrust washer 286. Cover plate 276 is provided with tabs 294, which may be formed by lancing a base portion 276a of cover plate 276. Tabs 294 each include an axially extending section 294a extending from base section 276a and a radially extending section 294b extending radially inward from axially extending section 294a to form a free end 294c of tab 294.

On the first side thereof, an annular body 292 of thrust washer 286 includes a low friction radially extending thrust surface 292b for contacting inner surface 88 of front cover 12 (FIG. 2), while on a back side thereof facing cover plate 276, annular body 292 includes a further radially extending surface 292c contacting cover plate 276. In one preferred embodiment, thrust washer 286 is formed of a polymer such as Torlon such that thrust surface 292b is low friction. An outer circumferential surface 292a and an inner circumferential surface 292d of annular body 292 extend axially between radially extending surfaces 292b, 292c. In one embodiment, thrust surface 292b can include a plurality of circumferentially spaced radially extending grooves similar to grooves 96 (FIG. 4). Annular body 292 is provided with through holes 298 extending axially from front surface 292b to rear surface 292c.

Connectors 290 extend radially outward from outer circumferential surface 292a. More specifically, connectors 290 each include a radially extending surface 200 extending radially from outer circumferential surface 292a and an inclined surface 202, which is arc-shaped and extends circumferentially and radially outward from outer circumferential surface 292a and into the outer edge of radially extending surface 200. Surface 202 form an outer circumferential surface of connector 290 and is provided with a clip 204 that wraps around a radially inner portion of axially extending section 294a of the corresponding tab 294. Clip 204 is defined by two radially extending surfaces 204a, 204b of a groove 206 formed in outer circumferential surface 202. The first radially extending surface 204a contacts a radially extending surface 294c of axially extending section 294a and the second radially extending surface 204b contacts a radially extending surface 294d of axially extending section 294a.

When thrust washer 286 is connected to cover plate 276, axially extending section 294a of tab 294 is sandwiched circumferentially between radially extending surfaces 204a, 204b. To install connectors 290 onto tabs 294, circumferentially and radially extending surfaces 202, which form ramps, are each aligned adjacent to the respective radially inner surface 294e of axially extending section 294a of tab 294, and thrust washer 286 is rotated in a rotational direction R2 such that contact between inclined surface 202 and radially inner surface 294e of axially extending section 294a forces axially extending section 294a of tab 294 radially outward until each axially extending section 294a snaps radially inward into the respective groove 206 and surfaces 204a, 204b contact the respective surface 294c, 294d, connecting the thrust washer 286 to the cover plate 276.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A thrust washer comprising:
   an annular base including a radially extending thrust surface, a further radially extending surface on an opposite side of the annular base from the radially extending thrust surface, an outer circumferential surface extending axially from the radially extending thrust surface to the further radially extending surface and an inner circumferential surface extending axially from the radially extending thrust surface to the further radially extending surface; and
   radially extending connectors extending radially outward from the annular base, each of the radially extending connectors including a radially extending arm extending radially outward from the outer circumferential surface of the annular base and a circumferentially extending clip extending circumferentially from the radially extending arm past the radially extending arm,
   wherein each of the circumferentially extending clips extends circumferentially from an outer end of the radially extending arm, the radially extending arm including a radially extending surface extending radially outward from the outer circumferential surface of the annular base, the circumferentially extending clip extending circumferentially away from the radially extending arm past the radially extending surface of the radially extending arm.

2. Thrust washer as recited in claim 1 wherein each of the circumferentially extending clips includes a circumferentially extending portion extending circumferentially from the outer end of the radially extending arm and a radially extending portion extending radially inward from the circumferentially extending portion.

3. The thrust washer as recited in claim 1 wherein the radially extending thrust surface includes grooves extending radially from the inner circumferential surface to the outer circumferential surface.

4. A motor vehicle drivetrain assembly comprising:
   a component including a plurality of circumferentially spaced tabs; and
   a thrust washer comprising:
   an annular base including a radially extending thrust surface, a further radially extending surface on an opposite side of the annular base from the radially extending thrust surface, an outer circumferential surface extending axially from the radially extending thrust surface to the further radially extending surface and an inner circumferential surface extending axially from the radially extending thrust surface to the further radially extending surface; and radially extending connectors extending radially outward from the annular base, the thrust washer being connected to the component by each of the radially extending connectors being connected to a respective one of the tabs with a section of each of the tabs being sandwiched circumferentially between two radially extending surfaces of the respective radially extending connector.

5. The motor vehicle drivetrain assembly as recited in claim 4 wherein each of the radially extending connectors includes a radially extending arm extending from the annular base and a circumferentially extending clip extending circumferentially from an outer end of the radially extending arm, each circumferentially extending clip including a circumferentially extending portion extending circumferentially from the outer end of the radially extending arm and a radially extending portion extending radially inward from the circumferentially extending portion, the radially extending arm including a first of the two radially extending surfaces extending radially outward from the outer circumferential surface of the annular base, the circumferentially extending clip including a second of the two radially extending surfaces, the section of each of the tabs being sandwiched circumferentially between two radially extending surfaces of the respective radially extending connector being an axially extending section.

6. The motor vehicle drivetrain assembly as recited in claim 5 wherein an inner surface of the circumferentially extending portion of each of the radially extending connectors contacts an outer surface of the axially extending section of the respective tab.

7. The motor vehicle drivetrain assembly as recited in claim 4 wherein the component includes a base portion, the tabs being lanced from the base portion.

8. The motor vehicle drivetrain assembly as recited in claim 4 wherein each of the radially extending connectors includes an inclined surface and a clip defined by a groove formed in the inclined surface the tabs each including an axially extending section being secured by the clip and being held in the groove.

9. A torque converter comprising:

the motor vehicle drivetrain assembly as recited in claim 4.

10. The torque converter as recited in claim 9 wherein the component is a cover plate of a damper assembly.

11. The torque converter as recited in claim 10 further comprising a front cover including a radially extending section and an axially extending section, the thrust washer being axially between the radially extending section of the front cover and the cover plate.

12. A method of connecting a thrust washer to a component comprising:

providing a component including a plurality of circumferentially spaced tabs; and connecting the thrust washer as recited in claim 1 to the component by rotating thrust washer such that the circumferentially extending clip of each of the radially extending connectors secures a respective axially extending section of one of the tabs.

13. The method as recited in claim 12 wherein each circumferentially extending clip including a circumferentially extending portion extending circumferentially from the outer end of the radially extending arm and a radially extending portion extending radially inward from the circumferentially extending portion, the axially extending section of each of the tabs is sandwiched between the radially extending arm and the radially extending portion of the respective radially extending connector when the clip contacts a radially extending edge of the respective axially extending section.

14. The method as recited in claim 12 wherein the component is a cover plate of a damper assembly of a torque converter.

15. A thrust washer comprising:

an annular base including a radially extending thrust surface, a further radially extending surface on an opposite side of the annular base from the radially extending thrust surface, an outer circumferential surface extending axially from the radially extending thrust surface to the further radially extending surface and an inner circumferential surface extending axially from the radially extending thrust surface to the further radially extending surface; and radially extending connectors extending radially outward from the annular base, each of the radially extending connectors each including two radially extending surfaces circumferentially facing each other, wherein each of the radially extending connectors including a radially extending arm extending radially outward from the outer circumferential surface of the annular base and a circumferentially extending clip, the radially extending arm including a first of the two radially extending surfaces extending radially outward from the outer circumferential surface of the annular base, the circumferentially extending clip extending circumferentially away from the radially extending arm past the radially extending surface of the radially extending arm, the circumferentially extending clip including a second of the two radially extending surfaces.

16. The thrust washer as recited in claim 15 wherein each of the circumferentially extending clips includes a circumferentially extending portion extending circumferentially from the radially extending arm and a radially extending portion extending radially inward from the circumferentially extending portion, the radially extending portion of the circumferentially extending clip including the second of the two radially extending surfaces, the circumferentially extending portion extending from the first of the two radially extending surfaces to the second of the two radially extending surfaces.

* * * * *